July 2, 1963 D. K. KILCUP 3,095,749
INTERMITTENT MOTION MECHANISM
Filed July 29, 1960 5 Sheets-Sheet 1

INVENTOR.
Dillon K. Kilcup
BY
Atty.

INVENTOR.
Dillon K. Kilcup
BY
atty.

INVENTOR.
Dillon K. Kilcup

July 2, 1963  D. K. KILCUP  3,095,749
INTERMITTENT MOTION MECHANISM
Filed July 29, 1960  5 Sheets-Sheet 4
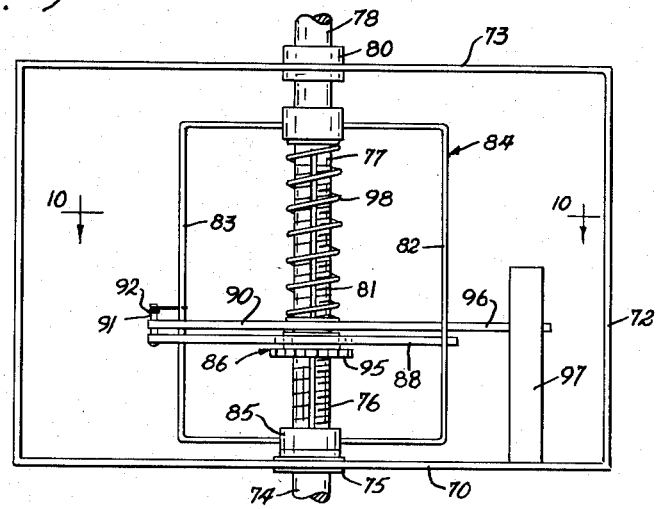
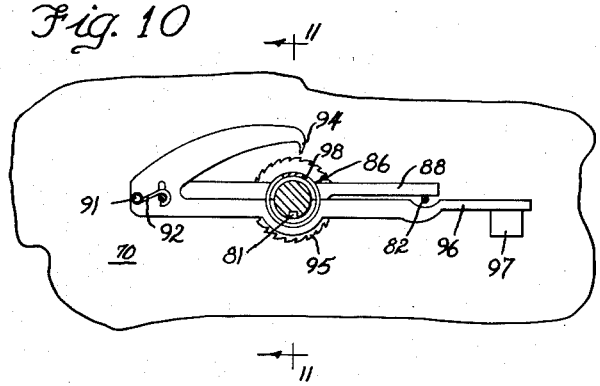
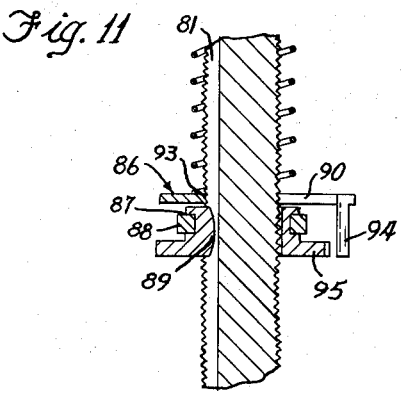
INVENTOR.
Dillon K. Kilcup
BY
Atty.

July 2, 1963  D. K. KILCUP  3,095,749

INTERMITTENT MOTION MECHANISM

Filed July 29, 1960  5 Sheets-Sheet 5

INVENTOR.
Dillon K. Kilcup
BY
Atty.

# United States Patent Office

3,095,749
Patented July 2, 1963

3,095,749
INTERMITTENT MOTION MECHANISM
Dillon K. Kilcup, W. 1012 Cleveland, Spokane, Wash.
Filed July 29, 1960, Ser. No. 46,197
5 Claims. (Cl. 74—84)

This invention relates to a novel apparatus for producing intermittent motion.

The apparatus disclosed herein comprises basically a half nut which is periodically engaged by a threaded shaft, causing the nut to travel along the shaft intermittently.

It is an object of this invention to devise a simple reliable intermittent motion mechanism using easily fabricated components.

It is another object of this invention to provide such a mechanism which requires little input power for portable installations.

These and further objects will be evident from a study of the following description and the accompanying drawings, which illustrate three preferred forms of the invention. These forms are merely for purposes of illustration and are not intended to limit the extent of the invention except as it is limited by the annexed claims.

In the drawings:

FIGURE 9 is a side view of a second embodiment of the invention;

FIGURE 10 is a sectional view taken along line 10—10 in FIGURE 9;

FIGURE 11 is a sectional view taken substantially along line 11—11 in FIGURE 10;

Figure 1:
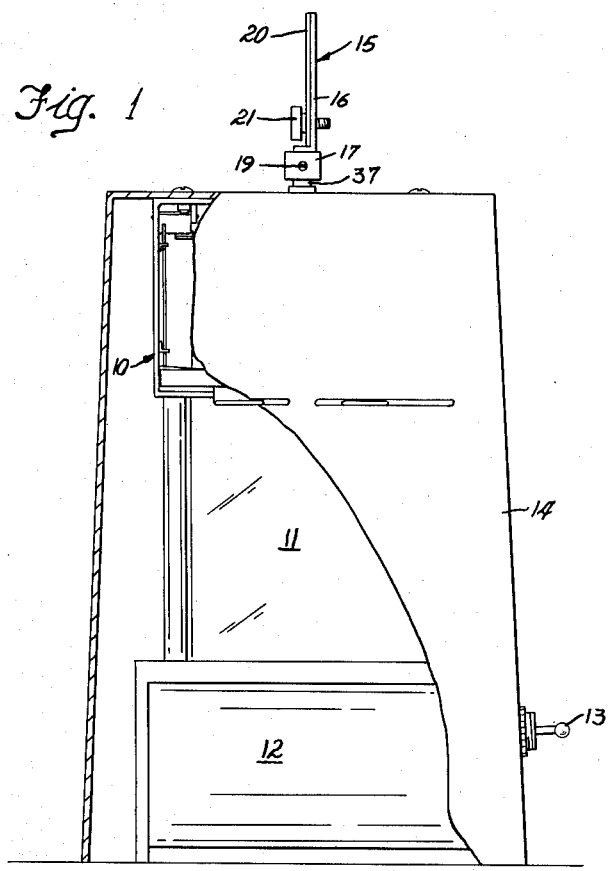
FIGURE 1 is a fragmentary front plan view of the device in a movable sign installation, the outer front wall being partially broken away.

Referring now to the drawings, the first embodiment in FIGURES 1–8 is shown as it would be utilized for display purposes. This is a portable arrangement for periodically rotating a sign which might be used for advertising. Since this utilization of the invention is merely illustrative, only a general description of this overall device will be given.

The intermittent motion mechanism 10 constitutes the upper portion of the device and is connected to a small D.C. motor 11, which has a battery power supply 12. A suitable switch for motor 11 is shown at 13. The entire unit is enclosed in a cover 14. Projecting from the top of the mechanism 10 is a clamp 15 in which a sign or other material may be held for display purposes. Clamp 15 consists of a first plate 16 which is integral with a collar 17 attached to the output shaft 37 of the device by means of a removable screw 19. A second plate 20 is held against plate 16 by means of a bolt 21 to complete the clamp.

The intermittent motion mechanism 10 is situated in a frame 22 which consists of a flat sheet of metal formed to provide a bottom section 23, two sides 24, 25 and two upper ledges 26, 27. A cross plate 28 connects ledges 26, 27 to complete a box-like structure.

Rotatably mounted in bearing 29 which is fixed in an aperture cut through bottom section 23, is an input or drive shaft 30 which may be driven by any suitable prime mover. Fixed to the upper end of input shaft 30 is a collar 31 which is held by screw 32. A threaded shaft 33 is formed integrally with collar 31 and extends upwardly from its center. Shaft 33 has a smooth surface 34 at its upper end, which is received in a bearing 35 fixed to a rotating arm 36. Arm 36 has an integral central shaft 37 formed thereon, which journals in bearing 38 fixed to cross plate 28. Shaft 37 serves as the output or driven shaft for the mechanism.

A vertical extension plate 39 extends downwardly from arm 36 and terminates in a horizontal portion 40 which is rotatably mounted on the threaded shaft 33. The aperture 41, through which shaft 33 passes, is larger than the outer diameter of the threads on shaft 33. The portion 40 of extension plate 39 rests upon collar 31 with frictional contact. The frictional resistance between collar 31 and portion 40 may be increased by use of materials having a high coefficient of friction or may be decreased by bearings or lubrication. The amount of frictional resistance desired must be adjusted to the size of the mechanism and the loads involved. In any case, slippage between collar 31 and portion 40 is a requisite above a certain minimum load. These elements form a slip coupling between drive shaft 30 and driven shaft 37.

Figure 7:
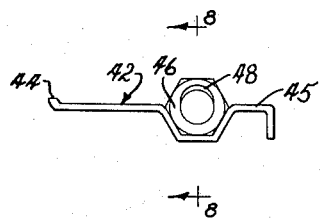
FIGURE 7 is an enlarged top view of the key shown in FIGURE 2.
Figure 8:
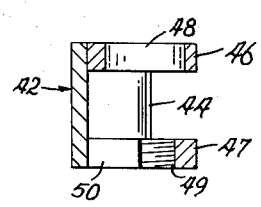
FIGURE 8 is a sectional view taken along line 8—8 in FIGURE 7.
Figure 2:
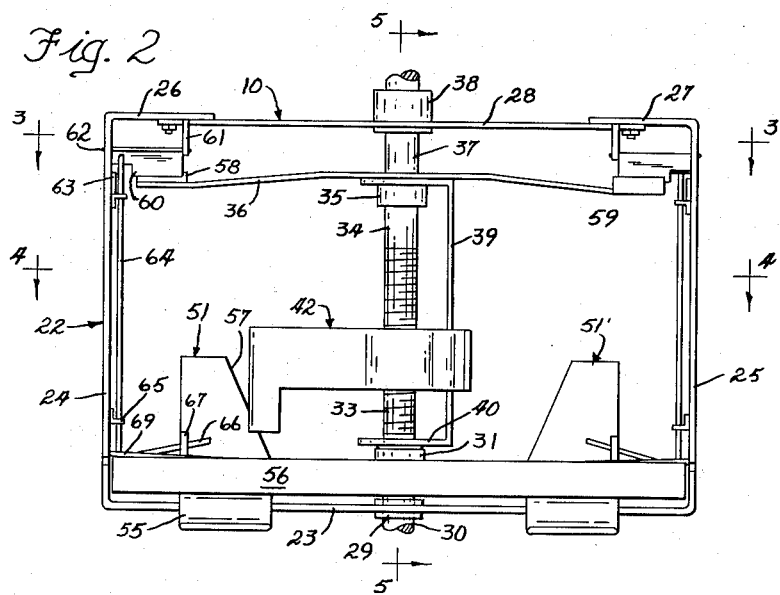
FIGURE 2 is an enlarged front view of the intermittent drive mechanism shown in FIGURE 1.
Figure 3:
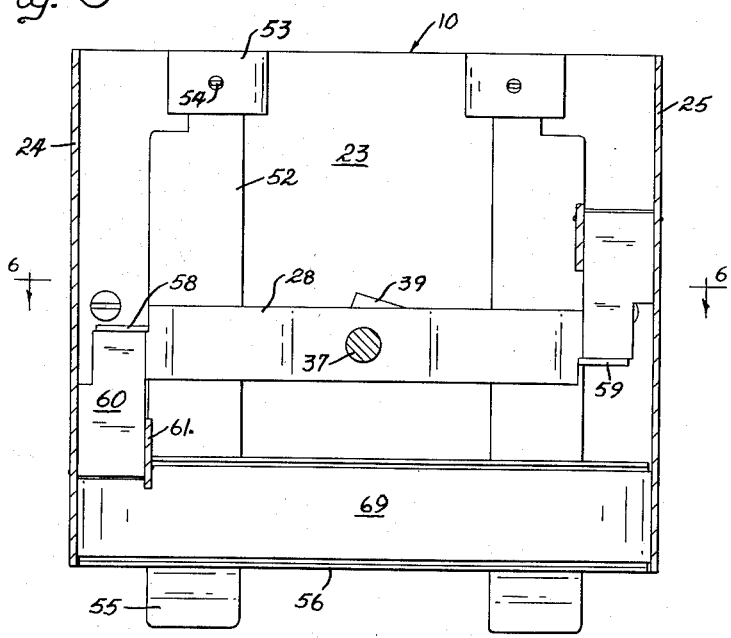
FIGURE 3 is a sectional view taken along line 3—3 in FIGURE 2.
Figure 4:
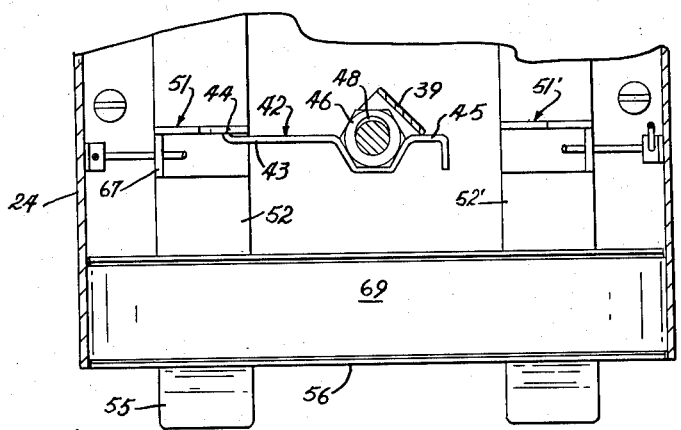
FIGURE 4 is a sectional view taken along line 4—4 in FIGURE 2.
Figure 5:
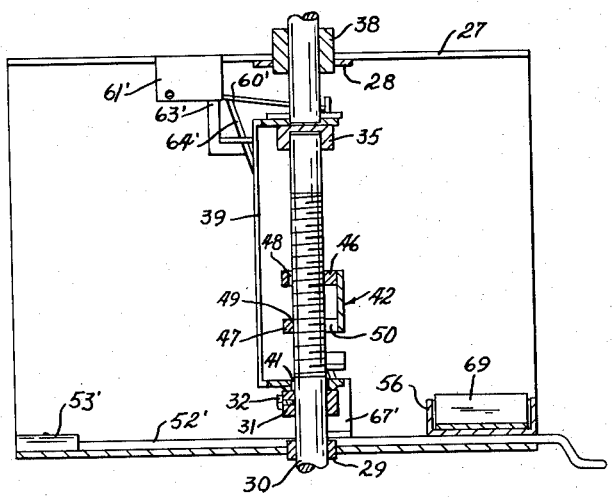
FIGURE 5 is a sectional view taken along line 5—5 in FIGURE 2.
Figure 6:
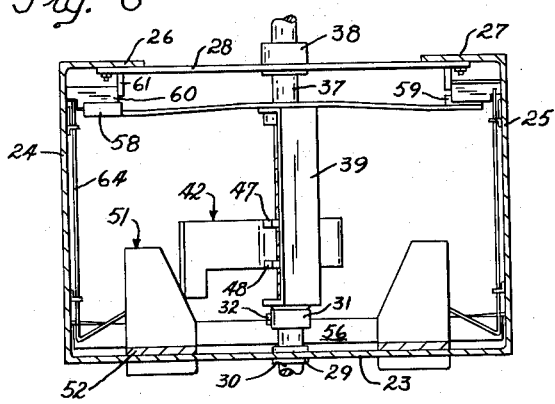
FIGURE 6 is a sectional view taken along 6—6 in FIGURE 3.

The movable carrier or key 42 which is shown in enlarged detail in FIGURES 7 and 8 comprises an abutment 43 which has a vertical edge 44 at one end and a bent counterbalance 45 at its remaining end. The central portion of key 42 has two horizontal members 46, 47 which are fixed to abutment 43. These members 46, 47 may be formed integrally with abutment 43 or may be separate parts fixed to it. They can also be formed from common nuts having a thread corresponding to that on shaft 33.

The upper element 46 is a bearing, and has an oval aperture 48 which will slide over shaft 33 freely. The lower element 47 is a half nut. The threaded portion 49 is located on the same side of key 42 as is faced by edge 44. The remainder of the aperture 50 is cut away so as to provide clearance from shaft 33. The counterbalance 45 is located on the same side of key 42 as the cut away portion of aperture 50 and on the side opposite to the threads 49. Therefore, counter-balance 45 will normally bias threads 49 to a tilted position out of engagement with the threaded portion of shaft 33.

The control system comprises one or more stops, which may be fixed, movable or adjustable, as desired. In this embodiment two stops 51, 51' are shown as being movable. Since the stops are mirror images of each other, only one will be described. Stop 51 is a vertical plate mounted adjacent to input shaft 30 and fixed to a pivoted plate 52. Plate 52 is pivoted to bottom section 23 by raised ear 53 and a bent pivot 54 cut from plate 52. The remaining end of plate 52 extends beyond the front edge of section 23 and is formed into a handle 55. To maintain the plate 52 in position, a cross channel 56 is held against it near handle 55 by a cross spring 69 which is mounted in the lower portions of sides 24, 25.

Stop 51 is formed with a sloping inner edge 57 which may be moved toward the shaft 30 by means of handle 55. Edge 44 of key 42 will therefore strike stop 51 if stop 51 is moved into its rotary path, the effective height of stop 51 being the vertical height of edge 57 at the point contacted by edge 44. By selectively moving the handle 55, this effective height may be varied.

Arm 36 extends outwardly from bearing 35 and has two upstanding ears 58, 59 mounted on its leading edges as it rotates. Each operates in an identical manner. Ear 58 is shaped to contact a wiper 60 which is pivoted between an ear 61 depending from ledge 26 and an aperture 62 cut into side 24 at its upper portion. Wiper 60 is a rectangular plate and is positioned so as to be clear of ear 58 when edge 44 is in contact with stop 51. A limit to downward pivotal movement of wiper 60 is provided by a small ledge 63 fixed to the inner wall of side 24. Ledge 63 also contains an aperture through which a rod 64 extends. Rod 64 is mounted in a guide 65 also fixed to side 24 and terminates in an angular portion 66 bent upwardly from the horizontal. Portion 66 is slidably mounted in an ear 67 fixed to plate 52 at a right angle with respect to stop 51. The upper end of rod 64 is located directly below wiper 60 between its pivots and its outer end. It can thus be seen that rod 64 can lift wiper 60 when handle 55 is adjacent wall 24 and can lower the wiper 60 when the handle 55 is moved inward toward shaft 30.

The operation of this device is as follows. If both stops 51, 51' are positioned adjacent sides 24, 25 so as to clear the edge 44 of key 42, the frictional resistance between collar 31 and extension 40 will turn the entire assembly in unison. If a stop 51 is moved toward shaft 30, it will be contacted by key 42. This will stop key 42. The portion 40 of extension plate 39 will continue to turn a partial revolution until extension plate 39 abuts against abutment 43 in the vicinity of counterbalance 45. The pressure of extension plate 39 will force the threaded portion 49 of half-nut 47 into engagement with threaded shaft 33 which is turning with input shaft 30. This will cause key 42 to travel upwardly. During this interval the driven shaft 37 is motionless. When key 42 clears the sloping edge 57, counterbalance 45 will cause key 42 to tilt, disengaging threaded portion 49. Key 42 will then slip downwardly and rotation will commence as before described until another stop is contacted. The specific arrangement of two stops as shown can result in the output shaft 37 being rotated continuously, rotated between one of the two stops every revolution, or rotated 180° between stops which will result in its being held stationary for adjustable periods twice during each full revolution. More stops may be added if desired.

The wipers 60 serve to slow the output shaft 37 slightly to prevent sudden jarring and also act to position the shaft 37 by preventing backward rotation. The resulting mechanism is simple and effective in intermittently positioning a rotating body.

FIGURES 9-11 show a second embodiment of the invention which is unable where a positive driving connection between the drive shaft and driven shaft is required and where gravity cannot be depended upon to return the key to its starting position. This device is also set into a rectangular frame comprised of a bottom section 70, side sections 71, 72 and a top section 73.

A drive shaft 74 extends through a bearing 75 which is fixed to bottom section 70 and has an integral threaded portion 76 and an end bearing portion 77. Portion 77 is rotatably received in a lower section of driven shaft 78 which is journalled in bearing 80 which is set into the top section 73. The threaded portion 76 is provided with a longitudinal keyway, designated 81.

Fixed to driven shaft 78 is a rectangular frame 84 including two vertical rods or extensions 82, 83. This frame 84 is journalled at 85 so as to rotate freely about shaft 74. A carriage 86 encircles shaft portion 76 loosely so that it may freely slide along the shaft, being guided by a key 89. Carriage 86 is circular, and has a groove cut into it at 87 in which is journalled a plate 88. This plate 88 extends beyond frame 84 on either side and has two apertures which slidably encompass the vertical rods 82, 83. The lower surface of carriage 86 is enlarged and is formed as a ratchet wheel 95.

Directly above carriage 86 is a ratchet arm 90 which is adapted to abut rod 82. An oval slot receives rod 83. A rod 91 fixed to plate 88 at one end extends through arm 90 and has fixed to it a coiled spring 92 which has its other end wrapped around rod 83. Ratchet arm 90 has a semi-circular center opening which is provided with threads at 93 to form a half nut. Arm 90 also has an integral pawl 94 which is located adjacent to the ratchet wheel 95. Spring 92 is adjusted so as to urge the threads of half-nut 93 away from the threaded portion 76 of shaft 74 and to urge pawl 94 into engagement with ratchet wheel 95.

The ratchet arm 90 extends outwardly at 96 to form an abutment which may engage a fixed or movable stop, shown as a simple bar 97. Bar 97 is fixed to bottom section 70. A spring 98 is coiled about shaft 74 and abuts the frame 84 and ratchet arm 90 to continually urge carriage 86 downward toward bottom section 70.

In operation, the spring 92 will normally retain the pawl 94 in engagement with ratchet wheel 95. The key 89 causes the entire assembly to turn as a unit in a positive driving relationship. Since the half nut 93 is disengaged, carriage 86 will ride adjacent the lower section 70 due to the biasing of spring 98.

When stop bar 97 is encountered, it will pivot arm 90 about rod 91 against the bias of spring 92 and will engage the half-nut 93, while disengaging pawl 94. The carriage 86 will therefore travel upward along threaded portion 76 of drive shaft 74, but will not turn. This will hold frame 84 motionless, which will also stop the driven shaft 78. When the arm 90 clears the top of stop bar 97, spring 92 will disengage half-nut 93 and repeat the cycle. A number of stop bars may be provided of any desired height, depending upon the period of hesitation desired and the required indexing.

Figure 12:
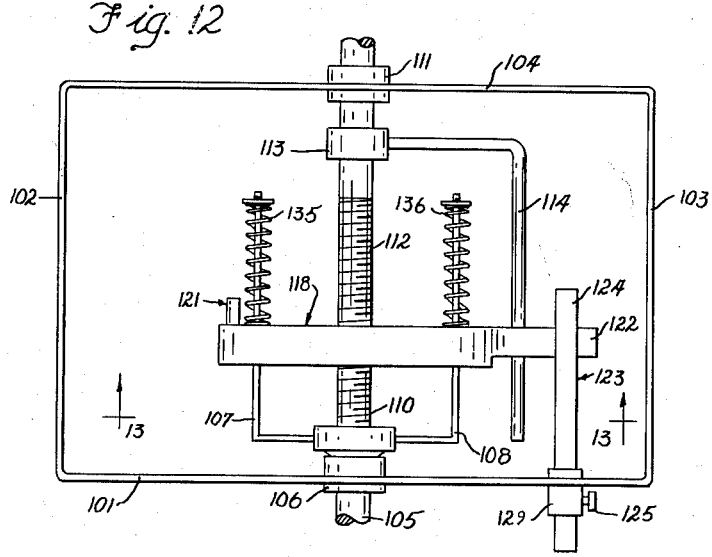
FIGURE 12 is a side view of a third embodiment of the invention.
Figure 13:
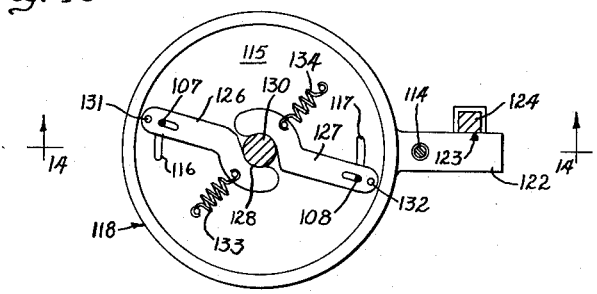
FIGURE 13 is a sectional view taken along line 13—13 of FIGURE 12.
Figure 14:
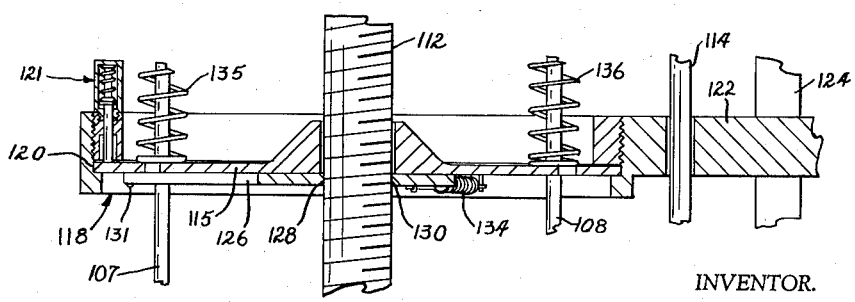
FIGURE 14 is a sectional view taken along line 14—14 of FIGURE 13.

FIGURES 12-14 show a third embodiment of the invention which is also spring biased. The frame consists of a bottom 101, two sides 102, 103 and a top 104. A drive shaft 105 is journalled within bearing 106 which is positioned through the bottom 101. The drive shaft 105 branches into two parallel rods 107, 108 and has a central opening which receives the lower end of the driven shaft 110. The driven shaft 110 is journalled through the top 104 by means of bearing 111. Shaft 110 has a lower threaded section 112 which is formed to a collar 113 at which a vertical arm 114 is attached to shaft 110.

A supporting carrier 115 encircles shaft 110 in the area covered by threads 112. The carrier 115 has a central opening which is wide enough to freely slide over the threads 112 and two arcuate openings 116, 117 through which are inserted the rods 107, 108. A hollow disk 118 is mounted on the carrier 115 by means of a channel 120 so as to be rotatable with respect to carrier 115, but is thereby prevented from moving axially with respect to the carrier 115. A spring actuated plunger 121 mounted on the upper side of disk 118 exerts frictional pressure upon carrier 115 to constitute a slip coupling between the two members. The disk 118 has an extension 122 which extends outward from its center so as to contact a stop 123.

Stop 123 is shown as an adjustable rod 124, whose length may be varied by means of screw 125 mounted in bracket 129 fixed to bottom 101. The arm 114, which is fixed to output shaft 110, is slidably engaged within the extension 122 so as to rotate in unison with the disk 118.

A pair of arms 126, 127 having threaded arcuate sides at 128, 130, respectively, are pivoted to the lower side of the carrier 115 by means of pins 131, 132 respectively. Each arm 126, 127 has an opening to receive the rods 107, 108 respectively. Each also has a spring connected to it and labeled 133, 134, the ends of springs 133, 134 being fixed to the lower surface of carrier 115. A pair of springs 135, 136 force disk 115 downward at all times.

The operation of the device is as follows. The normal rotation of the system is obtained through the frictional drag between carrier 115 and disk 118, which turns the entire assembly in unison. When stop 123 is engaged by extension 122, the continued rotation of the shaft 105 and rods 107, 108 pivot arms 126, 127 to threadably engage the sides 128, 130 with threaded portion 112 of the output shaft 110, which is held stationary along with extension 122. The rotation of shaft 105 will then rotate carrier 115, which will travel along threads 112 until the stop 123 is cleared by extension 122. At this point the renewed locking of disk 118 and carrier 115 under the action of plunger 121 will allow springs 133, 134 to retract arms 126, 127. Springs 135, 136 will then force the carrier 115 downward to complete the cycle, as the unit is again locked.

It is obvious that these three embodiments do not exhaust all possibilities. This mechanism basically provides an intermittent movement, which is rotary or reciprocating, since the threaded portion might be used to activate the output. There is always a period of motion and a period of rest, whose durations and spacings may be varied to suit the desired application. Since so many modifications are possible without deviating from the scope of this invention, it is not to be limited by this foregoing disclosure, except as it is defined in the claims.

Having thus described my invention, I claim:

1. An intermittent motion mechanism adapted to convert continuous rotary motion of a given velocity in a given direction to intermittent rotary motion of the same velocity and in the same direction, comprising:
   a rigid supporting framework;
   a drive shaft mounted on said framework for rotation about its longitudinal central axis, said drive shaft being adapted to be continuously rotated by a prime mover;
   a driven shaft mounted on said framework for independent rotation coaxially with said drive shaft;
   a stop mounted on said frame and extending along a portion of said drive shaft at a radially spaced distance therefrom;
   an extension fixed to said driven shaft and extending alongside said drive shaft at a radially spaced distance therefrom;
   coupling means operatively connecting said drive shaft and said extension adapted to normally transmit rotational motion from said drive shaft to said driven shaft through said extension at a one to one ratio;
   a carrier mounted on one of said shafts for selective rotational and longitudinal motion relative thereto and extending radially outward therefrom so as to be engageable with both said stop and said extension, said carrier being biased longitudinally parallel to said shaft axis so as to normally abut said stop following rotation of said carrier about the shaft axis to thereby interrupt the transmission of rotational motion between said drive and driven shafts through said coupling means by blocking rotation of said extension;
   and means on said carrier engageable with said one shaft during abutment of said stop by said carrier adapted to effect longitudinal motion of said carrier parallel to said shaft axis during such abutment to thereby enable said carrier to periodically clear said stop.

2. A mechanism as defined in claim 1 wherein said one shaft is threaded adjacent said extension and said stop;
   said last-named means comprising releasable thread means on said carrier adapted to selectively engage the threaded portion of said one shaft during abutment of said stop by said carrier.

3. An intermittent motion mechanism adapted to convert continuous rotary motion of a given velocity in a given direction to intermittent rotary motion of the same velocity and in the same direction, comprising:
   a rigid supporting framework;
   a drive shaft mounted on said framework for rotation about its longitudinal central axis, said drive shaft being adapted to be continuously rotated by a prime mover;
   a driven shaft mounted on said framework for independent rotation coaxially with said drive shaft;
   a stop mounted on said frame and extending along a portion of said drive shaft at a radially spaced distance therefrom;
   an extension fixed to said driven shaft and extending alongside said drive shaft at a radially spaced distance therefrom;
   slip coupling means operatively connected between said drive shaft and said extension adapted to normally transmit rotational motion from said drive shaft to said driven shaft through said extension at a one to one ratio;
   a carrier mounted on said drive shaft for selective rotational and longitudinal motion relative thereto and extending radially outward therefrom so as to be engageable with both said stop and said extension, said carrier being biased to an initial longitudinal position axially of said drive shaft wherein it will abut said stop following rotation of said carrier about said shaft axis and will be subjected to the frictional turning force of said slip coupling as transmitted through said extension, thereby blocking the transmission of rotational motion between said drive and driven shafts;
   and means on said carrier engageable with said drive shaft during abutment of said stop by said carrier adapted to effect longitudinal motion of said carrier parallel to said shaft axis during such abutment to thereby enable said carrier to periodically clear said stop.

4. An intermittent motion mechanism adapted to convert continuous rotary motion of a given velocity in a given direction to intermittent rotary motion of the same velocity and in the same direction, comprising:
   a rigid supporting framework;
   a drive shaft mounted on said framework for rotation about its longitudinal central axis, said drive shaft being adapted to be continuously rotated by a prime mover, a portion of said drive shaft being externally threaded;
   a driven shaft mounted on said framework for independent rotation coaxially with said drive shaft;
   a stop mounted on said frame and extending along said drive shaft at a radially spaced distance therefrom;
   an extension fixed to said driven shaft and extending alongside the threaded portion of said drive shaft at a radially spaced distance therefrom;
   slip coupling means operatively connected between said drive shaft and said extension adapted to normally transmit rotational motion from said drive shaft to said driven shaft through said extension at a one to one ratio;
   a carrier mounted on said drive shaft for selective rotational and longitudinal motion relative thereto and extending radially outward therefrom so as to be engageable with both said stop and said extension, said carrier being provided with counterbalance means adapted to normally position said carrier at a position relative to said drive shaft wherein it will abut said stop following rotation of said carrier about said shaft axis and will be subjected to the frictional turning force of said slip coupling as transmitted through said extension, thereby blocking the transmission of rotational motion between said drive and driven shafts;

and internally threaded means on said carrier engageable with the threaded portion of said drive shaft when the carrier is subjected to the frictional turning force transmitted by said extension in opposition to said counterbalance means during abutment of said stop by said carrier adapted to effect longitudinal motion of said carrier parallel to said shaft axis during such abutment to thereby enable said carrier to periodically clear said stop.

5. A mechanism as defined in claim 4 wherein said stop is adjustably mounted on said framework so as to selectively vary the effective length of the stop as abutted by said carrier.

References Cited in the file of this patent

UNITED STATES PATENTS

| | | |
|---|---|---|
| 2,512,714 | Carlzen | June 27, 1950 |
| 2,773,966 | Mastropole | Dec. 11, 1956 |
| 2,797,583 | Laschenski | July 2, 1957 |
| 2,837,925 | Rowley et al. | June 10, 1958 |